United States Patent
Cohen et al.

(10) Patent No.: US 9,381,791 B1
(45) Date of Patent: Jul. 5, 2016

(54) ELECTRIC SYSTEM FOR SHADING THE FRONT WINDSHIELD OF VEHICLES

(71) Applicants: Mordechai Cohen, Bni Brak (IL); David Davidi Levi Shatal, Bni Brak (IL)

(72) Inventors: Mordechai Cohen, Bni Brak (IL); David Davidi Levi Shatal, Bni Brak (IL)

( * ) Notice: Subject to any disclaimer, the term of this patent is extended or adjusted under 35 U.S.C. 154(b) by 0 days.

(21) Appl. No.: 14/615,508

(22) Filed: Feb. 6, 2015

(51) Int. Cl.
*B60J 3/02* (2006.01)

(52) U.S. Cl.
CPC .................. *B60J 3/0278* (2013.01)

(58) Field of Classification Search
CPC .......... B60J 3/02; B60J 3/0204; B60J 3/0213; B60J 3/0234; B60J 1/2063; B60J 7/0015; B60J 1/2019; B60J 1/2011; B60J 1/2075
USPC ...................... 296/97.8, 97.7, 97.4
See application file for complete search history.

(56) References Cited

U.S. PATENT DOCUMENTS

| | | | | |
|---|---|---|---|---|
| 3,343,868 A * | 9/1967 | Manookian, Jr. | ...... | B60J 3/0204 296/97.4 |
| 5,746,469 A * | 5/1998 | Nonaka | ............. | B60J 1/2088 296/97.4 |
| 2006/0202501 A1* | 9/2006 | Tadakamalla | ........ | B60J 1/2016 296/97.8 |
| 2010/0013262 A1* | 1/2010 | Shu | .................... | B60J 1/2038 296/97.8 |
| 2013/0328343 A1* | 12/2013 | Martinez | ............ | B60J 3/0247 296/97.4 |

FOREIGN PATENT DOCUMENTS

JP                04266522 A    *   9/1992

* cited by examiner

*Primary Examiner* — H Gutman

(57) ABSTRACT

An electrical system for shading the front windshield of vehicles that comprises a pair of upper cylinders, a pair of inner rods, a pair of sun shade screens, a motor, a pair of lower rods, a lead rod, a spring mechanism, and a vertical rod. The upper cylinder is shaped like a long, hollow pipe with a longitudinal slit, the inner rod is inserted into the upper cylinder and can rotate about its longitudinal axis and the upper edge of the sun shade screen is attached to the inner rod. The spring mechanism includes a spring that its top end is attached to the lead rod. The lead rod is a straight and long rod with a downward bend in the middle. The lead rod is attached to the bottom of the sun shade screen.

3 Claims, 5 Drawing Sheets

ELECTRIC SYSTEM FOR SHADING THE FRONT WINDSHIELD OF VEHICLES

TECHNICAL FIELD

The present invention refers to an electric system for shading the front windshield of a vehicle.

BACKGROUND ART

Parked vehicles are susceptible to the effects of sunlight penetrating the front windshield, especially in the summer. Such effects include damage to the inner parts of the vehicle, fading of plastic parts, fading and peeling of parts that are covered with leather and fabric, and excessive heating of the vehicle's interior. To solve these problems, many people use sunshades that are opened up inside the vehicle and placed up against the front windshield. The most commonly used sunshade is made of cardboard that is folded like an accordion. The invention, subject of the present patent application, offers an efficient, relatively inexpensive, and aesthetic solution to the above-mentioned problems.

DESCRIPTION OF THE DRAWINGS

The intention of the figures attached to the application is not to limit the scope of the invention and its application.

The figures are intended only to illustrate the invention and they constitute only one of its many possible implementations.

THE INVENTION

The main objective of the present invention is to provide an electrical system for shading the front windshield of vehicles that can be permanently installed in existing vehicles in a way that provides extensive covering of the internal surface of the front windshield. The sun shade screen, which is part of the said system, is positioned relatively close to the front windshield, and is designed so that the base of the front mirror does not interfere with the functioning of the system, which provides effective and extensive shading of the front windshield area.

Figure 1:
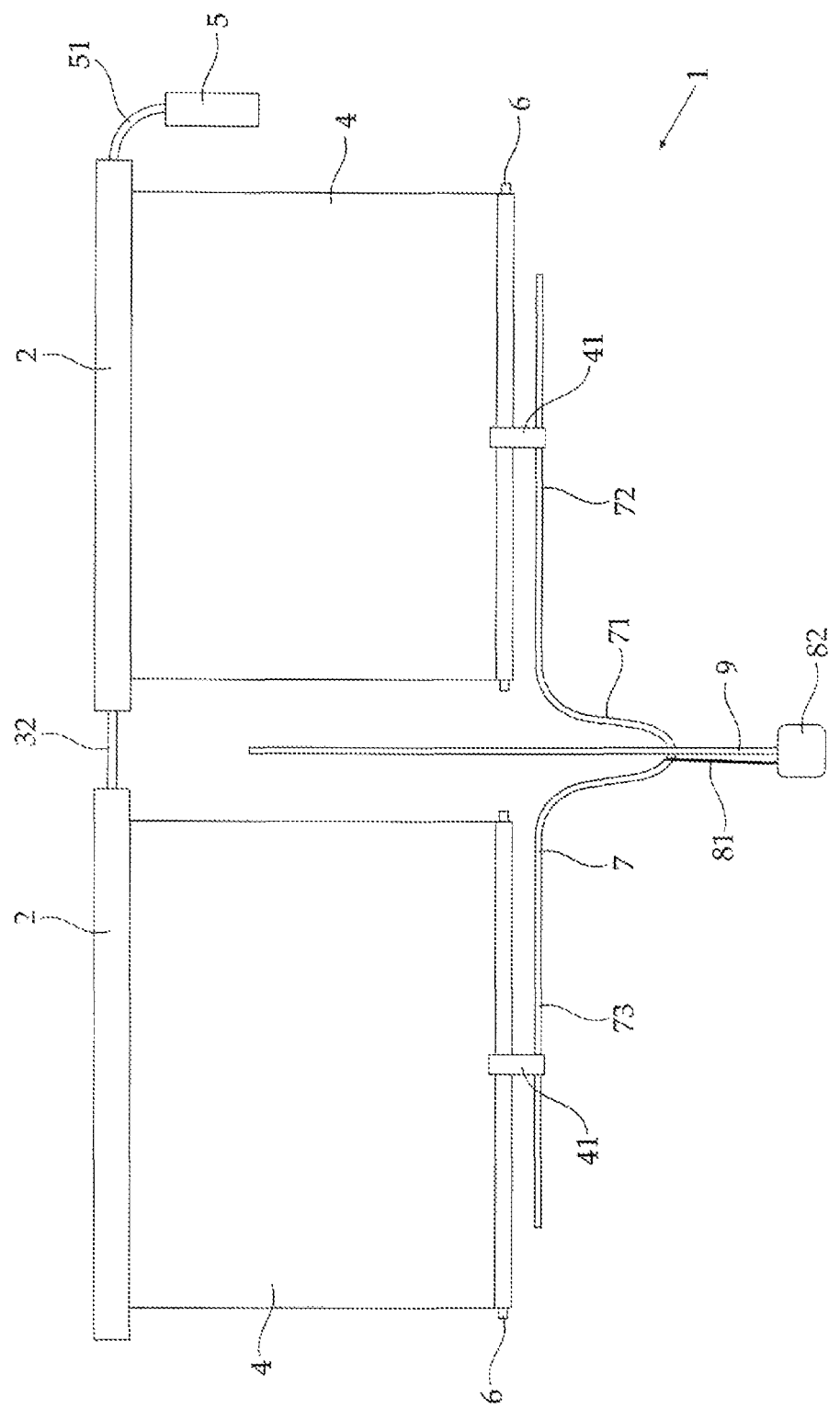
FIG. 1 presents a general view of the system (1), which comprises two upper cylinders (2), two sun shade screens (4), a motor (5), lower rods (6), a lead rod (7) with a bend in the middle (71), a spring mechanism (8) that comprises a housing (82) and a spring (81), and a vertical rod (9).

The electrical system for shading the front windshield (1) of a vehicle, subject of the present invention (hereinafter referred to as "the system"), comprises, in general, an upper cylinder (2), an inner rod (3), a sun shade screen (4), a motor (5), a lower rod (6), a lead rod (7), a spring mechanism (8), and a vertical rod (9). FIG. 1 presents a general view of the system (1) including its main components.

Figure 2:
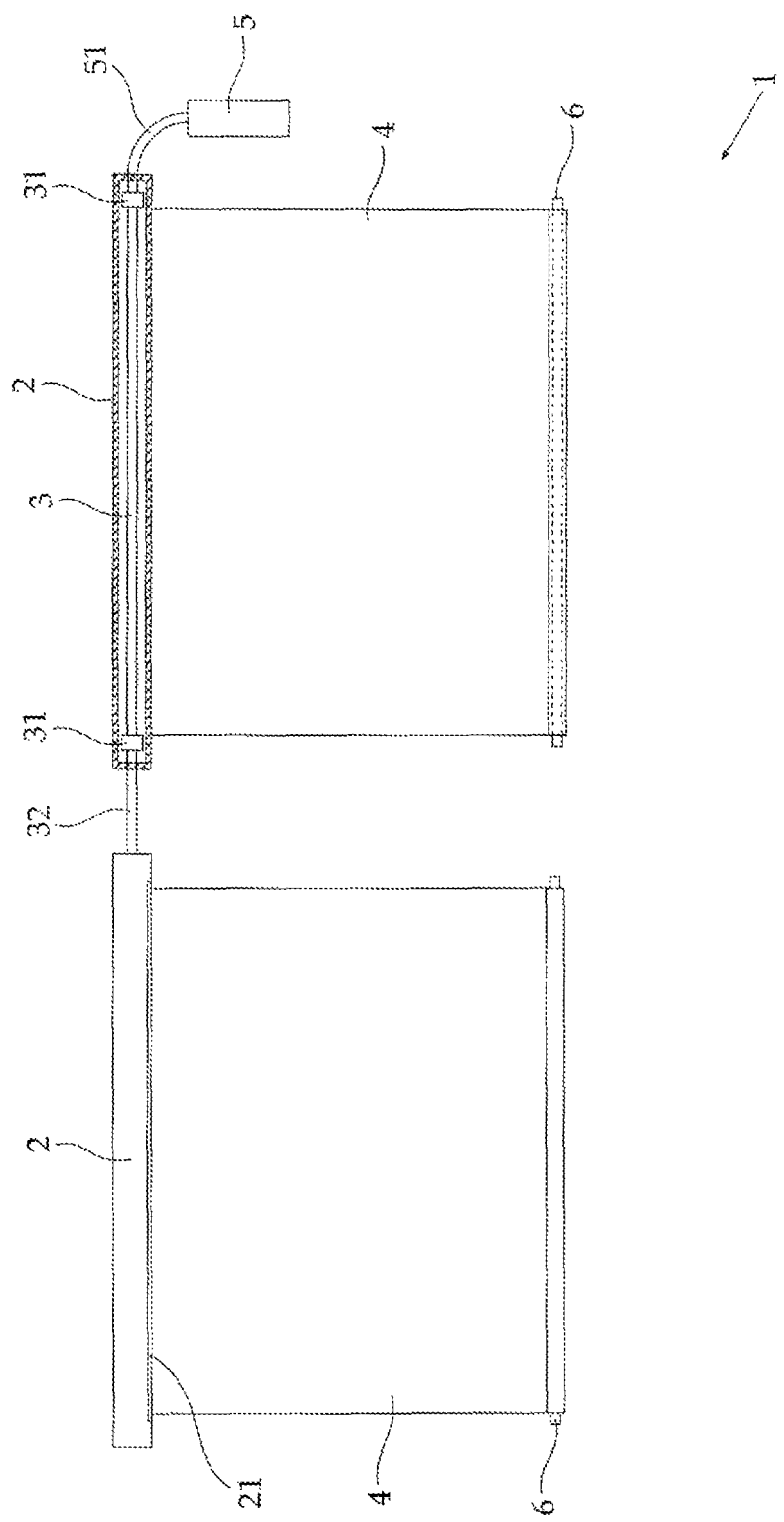
FIG. 2 depicts a pair of inner rods that are inserted into the upper cylinders (2), a central drive axle (32) that transmits power and motion between the inner rods (3), bearings (31), a drive axle (51), a motor (5), and sun shade screens (4).

The upper cylinder (2) is shaped like a long, hollow pipe with a narrow slit (21) that runs almost the entire length of the upper cylinder (2). The upper cylinder may also be shaped like an open rail, although the figures attached to this patent application depict it as a hollow pipe. The inner rod (3) is inserted into the upper cylinder (2) and the entire length of the upper edge of the sun shade screen (4) is attached to the inner rod (3) so that when the inner rod (3) rotates around its longitudinal axis in one direction, the screen (4) rolls up around it, and when it rotates in the opposite direction, the screen rolls down and is opened. To enable the system (1) to cover an extensive and significant area of the front windshield in a way that enables the sun shade screen (4) to be as close as possible to the front windshield, the system (1) consists of a pair of upper cylinders (2) with an inner rod (3) that is inserted into each cylinder and a sun shade screen (4) that is attached to each cylinder, as depicted in FIG. 2.

The upper cylinder (2) is permanently installed in the vehicle and is preferably attached to the top part of the side crossbeam adjacent to the vehicle's front windshield. The inner rod (3) is inserted into the upper cylinder (2) and can rotate freely around its longitudinal axis. A bearing (31) is connected to each end of the inner rod (3) so that, on the one hand, the inner rod (3) is fixed in place and has no freedom of movement at all within the upper cylinder (2), and on the other hand, the inner rod (3) can rotate freely around its longitudinal axis. The upper edge of the sun shade screen (4) is attached to the inner rod (3) and the sun shade screen (4) hangs down through the longitudinal slit (21) that extends along the bottom of the upper cylinder (2).

The motor (5) turns the inner rod (3) and causes the sun shade screen (4) to roll down when the inner rod (3) rotates in one direction and roll up when the inner rod (3) rotates in the opposite direction. The motor (5) is attached to the end of the inner rod (3) by means of a drive axle (51), as depicted in FIG. 2. The motor may be positioned in any of a variety of locations as long as the drive axle, which can be flexible, properly transmits the movement to the inner rod (3).

As mentioned above, and as depicted in the figures, the system (1) includes two upper cylinders (2) with an inner rod (3) inserted in each. Thus, the motor (5) may be connected by means of a drive axle (51) to the end of one inner rod (3) and the second inner rod (3) may be rotated by a central drive axle (32) that is connected to the two interior ends of the inner rods (3), such that when the inner rod (3) that is connected to the motor (5) rotates, the second inner rod (3) rotates as well.

Figure 3:
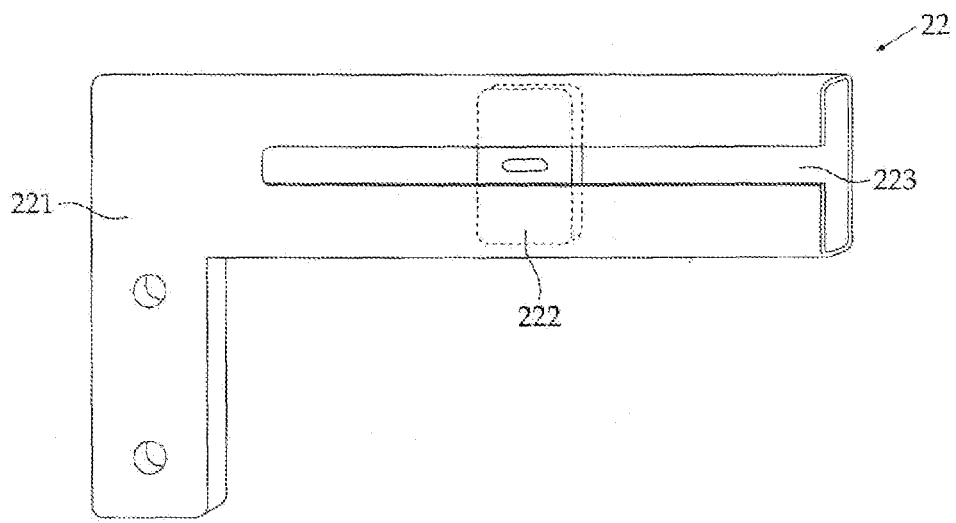
FIG. 3 depicts the adjustable bracket (22).

Adjustable connection bracket (22): The upper cylinder (2) may be connected to the front windshield directly, by connecting the out-facing ends of the upper cylinders (2) to the vehicle's crossbeam or by using an adjustable connection bracket (22), as depicted in FIG. 3. The connection bracket or any other holding device obviously may be attached to the edges of the front windshield and used to hold the upper cylinder (2) in place. The vertical arm (221) of the bracket (22) is permanently attached to the vehicle's crossbeam while the out-facing end of each of the upper cylinders (2) is attached to a piece (222) that is inserted into the horizontal portion (223) of the adjustable bracket (22). Thus, the system (1) can be manufactured with upper cylinders (2) of fixed length that can be installed in any vehicle regardless of the distance between its crossbeams by positioning the piece (222) that is inserted into the horizontal portion (223) according to the distance required in order to fix the system (1) in place.

The bottom rod (6) is attached to the bottom edge of the sun shade screen (4) so as to serve as a weight that causes the sun shade screen (4) to roll down easily and to remain taut, and to prevent it from folding. FIG. 2 shows how the lower rod (6) is attached to the bottom edge of the sun shade screen (4).

The spring mechanism (8): As explained above and as described in FIGS. 1 and 2, the upper cylinders (2) are installed horizontally and are positioned close and parallel to the top of the vehicle's front windshield. When the motor (5) turns, the sun shade screen (4) rolls down by force of its own weight and particularly by force of the weight of the lower rod (6). In order to facilitate fast and efficient descent of the sun shade screen (4), the inventor added a spring mechanism (8) to the system (1), which comprises a spring (81) that is compressed within a casing (82). The casing (82) is permanently attached to the dashboard, preferably very close to the middle of the base of the front windshield. The spring (81) is pulled out of the casing (82) and attached to the lead rod (7), which is itself attached to the sun shade screens (4), as will be described later on. When the sun shade screen (4) is in up position, in other words is rolled around the inner rod (3), the spring (81) is in tension and pulls the screen downward. When the motor (5) turns the inner rod (3), enabling the descent of the sun shade screen (4), the spring (81) pulls the screen (4) upward.

Figure 4:
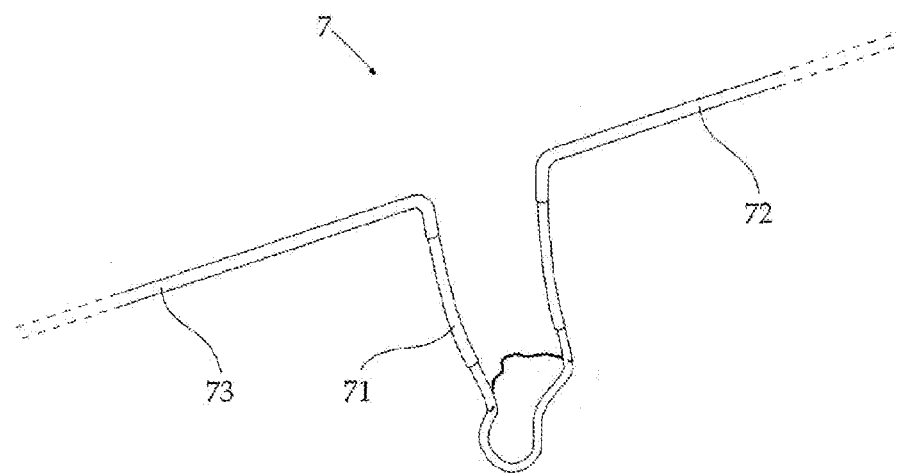
FIG. 4 depicts the lead rod (7) with a bend (71).

The lead rod (7): One of the more important components of the present invention is the lead rod, which has a unique and innovative design. The lead rod (7) is depicted in FIG. 4, and as is evident from the figures, is a straight, long rod that has a down-facing U-shaped bend (71) in the middle (hereinafter referred to as "the bend").

Figure 5:
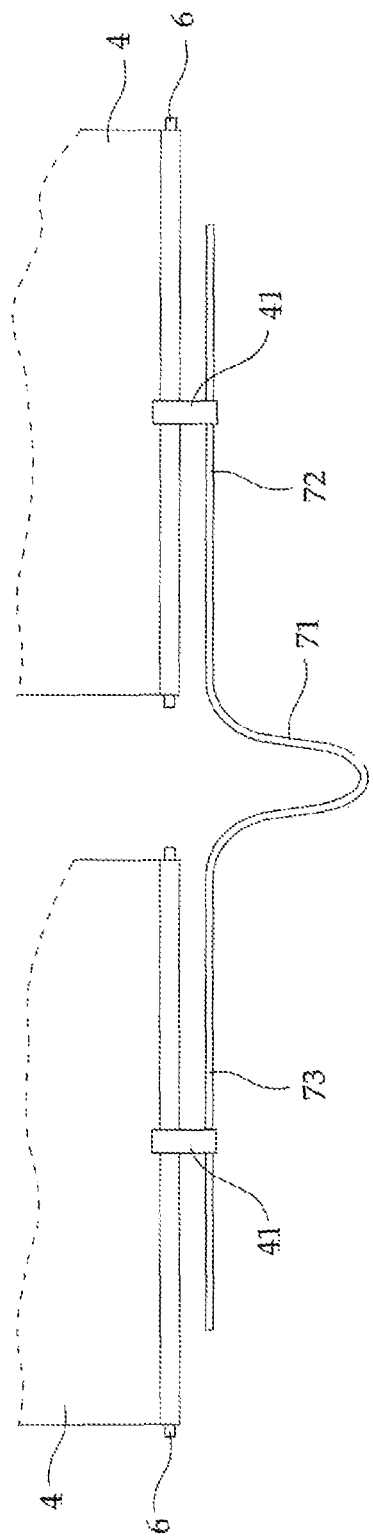
FIG. 5 depicts the lead rod (7) and the manner in which it is attached to the sun shade screens (4).
Figure 6:
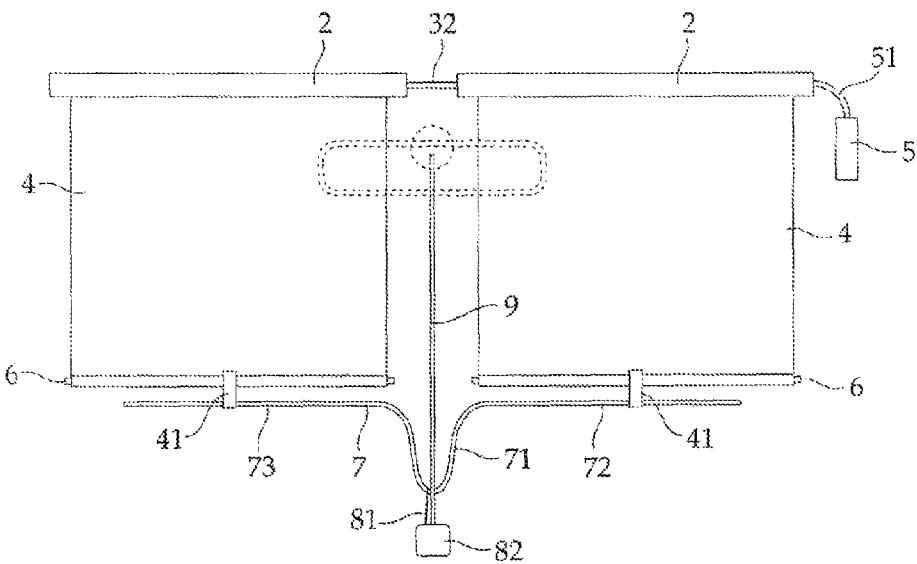
FIG. 6 depicts the system (1) with the sun shade screens (4) in down position.
Figure 7:
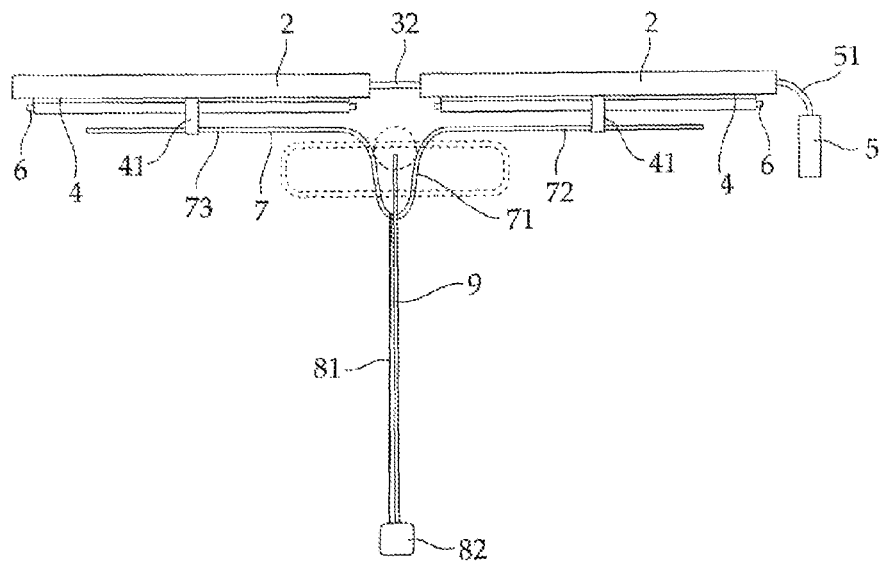
FIG. 7 depicts the system (1) with the sun shade screens (4) in up position.

The right-hand part (72) of the lead rod (7) is attached by a strap (41) to the bottom of the right-hand sun shade screen (4) while the left-hand part (73) of the lead rod (7) is attached by a strap (41) to the bottom of the left-hand sun shade screen (4), as depicted in FIG. 5. The spring (81) is attached to the lowest point in the bend (71), as depicted for instance in FIG. 1.

When the spring (81) pulls the lead rod (7) downward and the motor (5) rotates the inner rod (3) in such a way that the sun shade screen (4) is unwound, the sun shade screen (4) descends and covers the front windshield. When the motor (5) turns in such a way that the sun shade screen (4) is wound over the inner rod (3), the lead rod (7) rises so that the bend (71) is positioned around the base of the vehicle's front view mirror, while the horizontal parts (72) (73) of the lead rod (7) can rise even higher so that the sun shade screen (4) does not obstruct any part of the vehicle's front windshield. To enable the bend (71) to fit around the bases of different front view mirrors, the arms of the bend (71) can and should be telescopic so that the user may extend or shorten the length of the bend so as to adjust it to the base of the relevant front view mirror. Another possible way of achieving the said objective is to add a spring element to the arms of the bend (71), which then adjusts itself to the shape and position of the front view mirror.

The vertical rod (9) is depicted in FIG. 1. The lower end of the vertical rod is attached to the vehicle's dashboard and can and should be attached to the casing (82) of the spring mechanism (8), while the upper end of the vertical rod (9) is attached by means of an attachment device to the base of the front view mirror. The bend (71) is placed on the vertical rod (9) so that it faces out, as depicted for instance in FIG. 1. The vertical rod (9) serves as a kind of track that keeps the sun shade screens (4) as close as possible to the vehicle's front windshield, since they naturally tend to hang vertically down, while the front windshield is in fact slanted. The vertical rod (9), which is also attached to the front windshield, causes the sun shade screens (4) to be stay close to the front windshield rather than hang vertically.

What is claimed is:

1. An electrical system for shading the front windshield of vehicles that comprises a pair of upper cylinders, a pair of inner rods, a pair of sun shade screens, a motor, a pair of lower rods, a lead rod, a spring mechanism, and a vertical rod; whereby the upper cylinder is shaped like a long, hollow pipe with a longitudinal slit; whereby the inner rod is inserted into the upper cylinder and can rotate about its longitudinal axis; whereby the upper edge of the sun shade screen is attached to the inner rod and the sun shade screen can extend down from the upper cylinder through the said longitudinal slit; whereby the motor is connected to the end of the inner rod by means of a drive axle, and the inner rods are joined by means of a central drive axle; whereby the spring mechanism comprises a spring whose bottom end is attached near the base of the front windshield and its top end is attached to the lead rod; whereby the lead rod is a straight and long rod with a downward bend in the middle; whereby the lead rod is attached to the bottom of the sun shade screen; whereby the bottom end of the vertical rod is attached close to the middle of the bottom of the front windshield and its upper end is attached to the base of the front view mirror.

2. The system described in claim No. 1 whereby the arms of the said bend in the lead rod are adjustable telescopic arms.

3. The system described in claim No. 1 whereby the system also includes an adjustable connection bracket.

* * * * *